(12) United States Patent
Lei (10) Patent No.: US 11,451,729 B2
(45) Date of Patent: Sep. 20, 2022

(54) RESET METHOD, RESET DEVICE, AND RESET SYSTEM AND PIXEL ARRAY USING THE SAME

(71) Applicant: Ningbo ABAX Sensing Electronic Technology Co., Ltd., Ningbo (CN)

(72) Inventor: Shuyu Lei, Ningbo (CN)

(73) Assignee: Ningbo ABAX Sensing Electronic Technology Co., Ltd., Ningbo (CN)

( * ) Notice: Subject to any disclaimer, the term of this patent is extended or adjusted under 35 U.S.C. 154(b) by 0 days.

(21) Appl. No.: 17/288,279

(22) PCT Filed: Jun. 3, 2019

(86) PCT No.: PCT/CN2019/089767
§ 371 (c)(1),
(2) Date: Apr. 23, 2021

(87) PCT Pub. No.: WO2020/082737
PCT Pub. Date: Apr. 30, 2020

(65) Prior Publication Data
US 2021/0392281 A1 Dec. 16, 2021

(30) Foreign Application Priority Data

Oct. 24, 2018 (CN) .......................... 201811244514.6
Oct. 24, 2018 (CN) .......................... 201811246810.X (51) Int. Cl.
*H04N 5/363* (2011.01)
(52) U.S. Cl.
CPC ................................ *H04N 5/363* (2013.01)

(58) Field of Classification Search
CPC .......................... H04N 5/363; H04N 5/37455
(Continued)

(56) References Cited

U.S. PATENT DOCUMENTS

| 6,914,631 B2 | 7/2005 | Udo et al. |
| 7,652,704 B2 | 1/2010 | Mauritzson et al. |

(Continued)

OTHER PUBLICATIONS

International Search Report, Application No. PCT/CN2019/089767, dated Aug. 13, 2019, 4 pages.

*Primary Examiner* — Lin Ye
*Assistant Examiner* — Chan T Nguyen
(74) *Attorney, Agent, or Firm* — Ziegler IP Law Group, LLC (57) ABSTRACT

The embodiments of the present disclosure provide a reset method, a reset device, a reset system and a pixel array using the same. The reset method includes an electric charge accumulation unit being configured to store a first electric charge and an electric charge storage unit being configured to store a second electric charge. A polarity of the first electric charge is opposite to a polarity of the second electric charge. The reset method includes controlling the electric charge storage unit to obtain the second electric charge; and resetting the electric charge accumulation unit so as to transfer a preset amount of the second electric charge from the electric charge storage unit to the electric charge accumulation unit, which includes a third port of the control module applying a control voltage to a second end of the electric charge storage unit; and meanwhile charging the electric charge storage unit during the process of transferring the second electric charge.

20 Claims, 4 Drawing Sheets

(58) Field of Classification Search
USPC .......................................................... 348/250
See application file for complete search history.

(56) References Cited

U.S. PATENT DOCUMENTS

| | | | |
|---|---|---|---|
| 10,298,870 B2 | 5/2019 | Ni | |
| 10,582,140 B2 | 3/2020 | Hynecek | |
| 2004/0056694 A1* | 3/2004 | Tsai | H03K 17/223 |
| | | | 327/142 |
| 2011/0074470 A1* | 3/2011 | Sanborn | H03K 17/223 |
| | | | 327/143 |
| 2012/0169385 A1* | 7/2012 | Ren | H03K 17/20 |
| | | | 327/142 |
| 2017/0201249 A1* | 7/2017 | Su | H02J 7/00 |

* cited by examiner

S301, controlling the electric charge storage unit to obtain the second electric charge S302, resetting the electric charge accumulation unit so as to transfer a preset amount of the second electric charge from the electric charge storage unit to the electric charge accumulation unit and the electric charge storage unit is therefore charged during the transferring of the second electric charge

RESET METHOD, RESET DEVICE, AND RESET SYSTEM AND PIXEL ARRAY USING THE SAME

The present application claims the priority of the Chinese patent application No. CN201811246810.X, filed with the Chinese Patent Office on Oct. 24, 2018 and titled with reset device and reset system, the entire content of which is incorporated in the present application by reference. The present application claims the priority of the Chinese patent application No. CN201811244514.6, filed with the Chinese Patent Office on Oct. 24, 2018 and titled with reset method, reset device and reset system, the entire content of which is incorporated in the present application by reference.

FIELD OF THE INVENTION

The present invention relates to the field of microelectronics, especially to a reset method, a reset device and a reset system and a pixel array using the same.

BACKGROUND OF THE INVENTION

With the development of information technology, various sensors are widely used and become the main way of obtaining information and play a vital role in automatic control and intelligence. There are many types of sensors, however the signal processing methods of these sensors are majorly analysis and processing by converting the information sensed by the sensors into electrical signals.

Figure 1A:
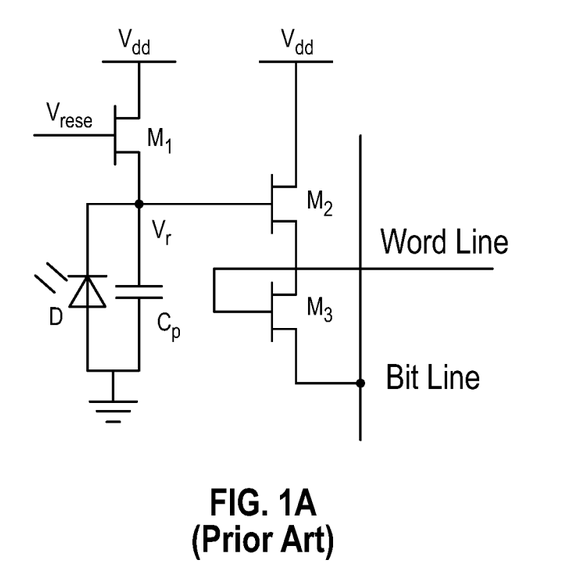
FIG. 1A is a schematic diagram schematically showing the structure of a reset circuit related to the prior art.

High precision and low noise are two important parameters of a sensor pixel array. However the reset method of circuits in a pixel will directly affect the two parameters, which thereby prejudices the application of the reset method. Taking a pixel with the APS structure shown in FIG. 1 as an example, a circuit reset unit usually resets each pixel by means of a reset voltage, where pixels with different working periods correspond to different reset voltages. The main working principle of reset voltages is that the circuit reset unit detects whether a voltage of a pixel has reached a value of the reset voltage, if it has reached the value the circuit reset unit will reset the pixel; if it has not reached the value the circuit reset unit continues to detect the voltage of the pixel. However such method of controlling reset is unable to control a reset at a precise timing. When using such reset control method in a pixel integral circuit, due to its inability of precisely controlling the reset timing of the pixel integral circuit, the reset control method will give rise to an early arrival or a delay of a reset timing of integrated electric charge in the pixel integral circuit, which will adversely affect the accuracy of the final amount of the output integrated electric charge. When it comes to image sensors, the reset control method may cause the after-reset-pixels to retain the image information arising from the before-reset-pixels, ie. image trailing may occur to pixels after they are reset. The reset control method may also introduce reset noise, such as KTC noise, during the circuit reset process so that the quality of output signal is affected.

SUMMARY OF THE INVENTION

The present invention provides a reset method, a reset device and a reset system and a pixel array both using the same to accurately control the reset timing. In addition, the technical solution provided by the present invention is of further assistance in avoiding introducing KTC noise during a circuit reset process, which reduces the noise in a reset circuit and improves the quality of output signal.

In a first aspect, the present invention provides a reset method. Where an electric charge accumulation unit is configured to store a first electric charge and an electric charge storage unit is configured to store a second electric charge. A polarity of the first electric charge is opposite to a polarity of the second electric charge. The reset method comprises the following steps: controlling the electric charge storage unit to obtain the second electric charge; resetting the electric charge accumulation unit so as to transfer a preset amount of the second electric charge from the electric charge storage unit to the electric charge accumulation unit, and meanwhile charging the electric charge storage unit during the process of transferring the second electric charge.

In a possible solution, controlling the electric charge storage unit to obtain the second electric charge specifically includes a first signal controlling the electric charge storage unit to charge. Resetting the electric charge accumulation unit specifically includes a second signal controlling the electric charge storage unit to discharge.

In a possible solution, the first signal controlling the electric charge storage unit to charge includes the first signal controlling a first switch so that the second electric charge could be stored in the electric charge storage unit. Where the first signal is output from a first port of a control module to the first switch, and the first switch is connected between a first end of the electric charge storage unit and the first port of the control module.

A possible solution, after the first signal controlling the electric charge storage unit to charge and before the second signal controlling the electric charge storage unit to discharge, further includes releasing the second electric charge stored in the electric charge storage unit from the first switch so that the electric charge storage unit is able to obtain the preset amount of the second electric charge.

In a possible solution, the second electric charge stored in the electric charge storage unit keeps releasing from the first switch until the first switch stays in a sub-threshold region, so that the electric charge storage unit is able to obtain the preset amount of the second electric charge.

In a possible solution, the second signal controlling the electric charge storage unit to discharge specifically includes the second signal controlling a second switch to be turned off so that the second electric charge could be transferred from the electric charge storage unit to the electric charge accumulation unit. The second signal is output from a second port of the control module to a control end of the second switch, and the second switch is connected between the first end of the electric charge storage unit and the electric charge accumulation unit.

During the second signal controlling the electric charge storage unit to discharge, a possible solution is that a first start time is defined when the second signal controls the second switch to be turned off. When the first start time runs through a first preset time period, or/and when the second switch is in the sub-threshold region, the second switch is turned off to stop the second electric charge from transferring from the electric charge storage unit to the electric charge accumulation unit.

During the transferring of the second electric charge from the electric charge storage unit to the electric charge accumulation unit, a possible solution further includes a third port of the control module applying a control voltage to a second end of the electric charge storage unit.

In a possible solution, the third port of the control module applying a control voltage to the second end of the electric charge storage unit specifically means that the control voltage applied to the second end of the electric charge storage unit through the third port of the control module is gradually changed according to a preset direction.

In a possible solution, the third port of the control module applying a control voltage to the second end of the electric charge storage unit specifically means that a second start time is defined when the second electric charge starts to transfer from the electric charge storage unit to the electric charge accumulation unit. When the second start time runs through a second preset time period, the third port of the control module charges the second end of the electric charge storage unit so as for the control voltage to change to a preset threshold. Then the control voltage is kept at the preset threshold until the second switch is turned off to stop charging the second end of the electric charge storage unit.

Before resetting the electric charge storage unit, a possible solution further includes determining whether a voltage converted by the first electric charge stored in the electric charge accumulation unit has exceeded a preset threshold voltage. Therefore resetting the electric charge accumulation unit specifically means that the electric charge accumulation unit will be reset once it is determined that the voltage converted by the first electric charge stored in the electric charge accumulation unit exceeds the preset threshold voltage.

Correspondingly in another possible solution, resetting the electric charge accumulation unit specifically means that once it is determined that the voltage converted by the first electric charge exceeds the preset threshold voltage, the control module resets the electric charge accumulation unit or the control module resets the electric accumulation unit according to a preset timing.

In a second aspect, the present invention provides a reset device. The reset device comprises an electric charge accumulation unit for storing a first electric charge; an electric charge storage unit for storing a second electric charge; a control module for controlling the electric charge storage unit to obtain the second electric charge and resetting the electric charge accumulation unit so as to transfer a preset amount of the second electric charge from the electric charge storage unit to the electric charge accumulation unit, and meanwhile the electric charge storage unit is charged during the process of transferring the second electric charge. A polarity of the first electric charge is opposite to a polarity of the second electric charge.

In a possible solution, the control module is further configured to control the electric charge storage unit to charge through the first signal before resetting the electric charge accumulation unit. During resetting the electric charge accumulation unit by the control module, the control module controls the electric charge storage unit to discharge through the second signal.

A possible solution further comprises a first switch. The first switch is connected between a first end of the electric charge storage unit and the first port of the control module. During the control module controlling the electric charge storage unit to charge through the first signal, the control module is further configured to control the first switch to allow the second electric charge to be stored in the electric charge storage unit through the first signal. The first signal is output from the first port of the control module to the first switch.

In a possible solution, after the first signal controlling the electric charge storage unit to charge and before the second signal controlling the electric charge storage unit to discharge, the control module is further configured to release the second electric charge stored in the electric charge storage unit through the first switch so that the electric charge storage unit is able to obtain the preset amount of the second electric charge.

In a possible solution, the control module is configured to release the second electric charge stored in the electric charge storage unit from the first switch until the first switch stays in a sub-threshold region, so that the electric charge storage unit is able to obtain the preset amount of the second electric charge.

A possible solution further comprises a second switch. The second switch is connected between the first end of the electric charge storage unit and the electric charge accumulation unit. During the control module controlling the electric charge storage unit to discharge through the second signal, the second switch is controlled through the second signal to be turned off so as to transfer the second electric charge from the electric charge storage unit to the electric charge accumulation unit. The second signal is output from a second port of the control module to a control end of the second switch.

During the second signal controlling the electric charge storage unit to discharge, a possible solution is that a first start time is defined when the second signal controls the second switch to be turned off. When the first start time runs through a first preset time period, or/and when the second switch is in the sub-threshold region, the second switch is turned off to stop the second electric charge from transferring from the electric charge storage unit to the electric charge accumulation unit.

During the transferring of the second electric charge from the electric charge storage unit to the electric charge accumulation unit, a possible solution further includes a third port of the control module applying a control voltage to a second end of the electric charge storage unit.

In a possible solution, the third port of the control module applying a control voltage to the second end of the electric charge storage unit specifically means that the control voltage applied to the second end of the electric charge storage unit through the third port of the control module is gradually changed according to a preset direction.

In a possible solution, the third port of the control module applying a control voltage to the second end of the electric charge storage unit specifically means that a second start time is defined when the second electric charge starts to transfer from the electric charge storage unit to the electric charge accumulation unit. When the second start time runs through a second preset time period, the third port of the control module charges the second end of the electric charge storage unit so as for the control voltage to change to a preset threshold. Then the control voltage is kept at the preset threshold until the second switch is turned off to stop charging the second end of the electric charge storage unit.

Before resetting the electric charge storage unit, a possible solution further includes determining whether a voltage converted by the first electric charge stored in the electric charge accumulation unit has exceeded a preset threshold voltage. Therefore resetting the electric charge accumulation unit specifically means that the electric charge accumulation unit will be reset once it is determined that the voltage converted by the first electric charge stored in the electric charge accumulation unit exceeds the preset threshold voltage.

In a possible solution, resetting the electric charge accumulation unit specifically means that once it is determined that the voltage converted by the first electric charge exceeds the preset threshold voltage, the control module resets the electric charge accumulation unit or the control module resets the electric accumulation unit according to a preset timing.

A third aspect of the embodiments of the present invention provides an electric charge reset device. The reset device comprises a plurality of electric charge reset modules, a plurality of latches and comparators shared by the plurality of electric charge reset modules in a time-sharing manner. The plurality of electric charge reset modules could be any reset devices provided in the second aspect. The comparators are configured to compare the voltage converted by the electric charge accumulation unit of the plurality of electric charge reset modules with a reference voltage. The comparison results are output to the plurality of latches respectively corresponding to the plurality of electric charge reset modules. The latches are configured to store the comparison results converted by its corresponding electric charge accumulation unit. The corresponding electric charge accumulation unit is controlled by the comparison results by the plurality of electric charge accumulation units. The electric charge reset module is configured to reset the electric charge in the electric charge accumulation unit.

A fourth aspect of the embodiments of the present invention further provides a reset system, which comprises any one of the reset devices in the third aspect, or the electric charge reset device illustrated in the third aspect.

A fifth aspect of the embodiments of the present invention further provides a pixel array, which comprises any one of the reset devices in the second aspect, or the electric charge reset device illustrated in the third aspect.

In the preset method provided in the embodiments of the present invention, through transferring the second electric charge whose polarity is opposite to that of the first electric charge from the electric charge storage unit to the electric charge accumulation unit, so that the first electric charge and the second electric charge are combined to cause a voltage change to the electric charge accumulation unit. Therefore an amount of the transferred electric charge upon each reset is precisely ensured, which in turn gives rise to a more accurate calculation of a total integrated electric charge. When applying this preset method in a circuit unit to control the accurate integration of electric charges, it helps avoid errors caused by an early arrival or a delay of a reset timing of the integrated electric charge in the pixel integral circuit and further improves the accuracy of a total amount of the integrated electric charge. Also the preset method prevents the circuit unit after reset from incurring image trailing, reduces reset noise, and improves the quality of output signal.

DETAILED DESCRIPTION OF ILLUSTRATED EMBODIMENTS

Embodiments will be detailed as reference hereinafter to illustrate the principle and spirit of the present invention. It should be understood that the following embodiments are only proposed to give the skilled in the art a better understanding so as to implement the present invention rather than limit the protection scope of the present invention. These embodiments are provided to make the disclosure more thorough and complete and to fully convey the scope of the present disclosure to the skilled in the art.

It should be understood that when describing units/modules as "interconnected", it means a unit/a module is either directly interconnected to the other unit/module or third units/modules are existing in between. When describing units/modules as "directly interconnected", it means no third units/modules existing in between.

Taking a pixel structure shown in FIG. 1 as an example to illustrate how does a pixel in the existing image sensor work. M1 represents a reset tube, M2 represents a source follower, and M3 represents a read switch. Where a power supply voltage of a pixel unit is Vdd, a reset voltage is Vr, and a maximum value of the reset voltage Vr is a difference between the power supply voltage Vdd and a threshold voltage Vth. When resetting the pixel shown in FIG. 1, a voltage Vrese goes higher, and M1 may work in a saturated state or a sub-threshold state. When the difference between the power supply voltage Vdd and the threshold voltage $V_{th}$ is not less than the reset voltage Vr, M1 is working in the saturated state and the power supply voltage Vdd charges a capacitor Cp through M1 until the reset voltage Vr is equal to the difference between the power supply voltage Vdd and the threshold voltage Vth. When the difference between the power supply voltage Vdd and the threshold voltage Vth is less than the reset voltage Vr, M1 is working in the sub-threshold state and the reset voltage Vr reaches the power supply voltage Vdd. During a real reset process, a reset time of the pixel is short and the reset tube M1 mainly works in the saturated state, therefore the sub-threshold state may not be considered for the time being.

The inventor found that circuit reset units in the existing sensors are usually controlled by a reset voltage, drawbacks of which are that such method is not only unable to control a reset at a precise timing but also introduces reset noise, such as KTC noise, during the circuit reset process so that the quality of output signal is affected. Additionally, delay or mismatch of components such as comparators used in the existing reset method will give rise to errors in an integral voltage, which in turn affects a calculation accuracy of a total integral voltage.

In order to reconcile at least one drawback mentioned, the present invention provides a reset method, a reset device, a reset system and a pixel array for accurately controlling an amount of electric charge reset by a circuit and improving a performance of an integral circuit or other functional circuits. Additionally, technical solution provided in the present invention help reduce or even avoid the introduction of KTC noise during a circuit reset process, which therefore gives rise to reduction of noise in a reset circuit and improvement of the quality of output signal. The reset method comprises an electric charge accumulation unit for storing a first electric charge, an electric charge storage unit for storing a second electric charge; where controlling the electric charge storage unit to obtain the second electric charge, resetting the electric charge accumulation unit to transfer a preset amount of the second electric charge from the electric charge storage unit to the electric charge accumulation unit; additionally the polarities of the first electric charge and the second electric charge are opposite. Through transferring the second electric charge whose polarity is opposite to that of the first electric charge from the electric charge storage unit to the electric charge accumulation unit, the preset method provided in the embodiments of the present invention causes a voltage change to the electric charge accumulation unit due to a combination of the first electric charge and the second electric charge. Therefore an amount of the transferred electric charge upon each reset is precisely ensured, which in turn gives rise to a more accurate calculation of a total integrated electric charge. When applying this reset method in a circuit unit to control the accurate integration of electric charge, it helps avoid errors caused by an early arrival or a delay of a reset timing of the integrated electric charge in the pixel integral circuit and further improves the accuracy of a total amount of the integrated electric charge. Also the reset method prevents the circuit unit after reset from incurring image trailing, reduces reset noise, and improves the quality of output signal.

In the present invention, the method, the device, the system and the pixel array are all based on the same invention concept. Since the working principles of the method, the device, the system and the pixel array are similar; the implementations of the method, the device, the system and the pixel array could be referred to each other. Therefore the repetition is omitted.

The technical solution provided in the present invention is applicable to circuit reset scenarios. For example in a scenario where resetting electric charge in a sensor, an embodiment of resetting electric charge could be a scenario of resetting multiple pixels or one pixel of a pixel array in a pixel sensor. The technical solution provided in the present invention is also applicable to a scenario where resetting electric charge in a pixel or a scenario where resetting electric charge in a folding integration system. Embodiments of the present invention are not confined to application to certain types of sensors or application to certain inner structures of a sensor.

The technical solution provided in the embodiments of the present invention is applicable to circuit systems, which includes but is not limited to integrated circuit systems, circuit systems adopting interconnected discrete components, or circuit systems adopting combination of integrated circuit and interconnected discrete components. For example the technical solution provided in the embodiments of the present invention is applicable to one of or a combination of the following integrated circuit systems: photodiode, photosensitive diode, complementary metal oxide semiconductor sensor, charge coupled device sensor, pressure sensor, and magnetic sensor etc. The technical solution provided in the embodiments of the present invention is also applicable to various metering systems or metering circuits, especially to small-sized sensors or metering circuits used in micro sensors. For example counter circuits used in a pixel array of an image sensor, electric charge counter circuits or electric charge collector circuits.

In a metering circuit used in a small-sized sensor or a micro sensor described as above, folding integration could be applied to integrate electric charge so as to reduce an area occupied by the integral circuit and to optimize an overall circuit structure.

Figure 1B:
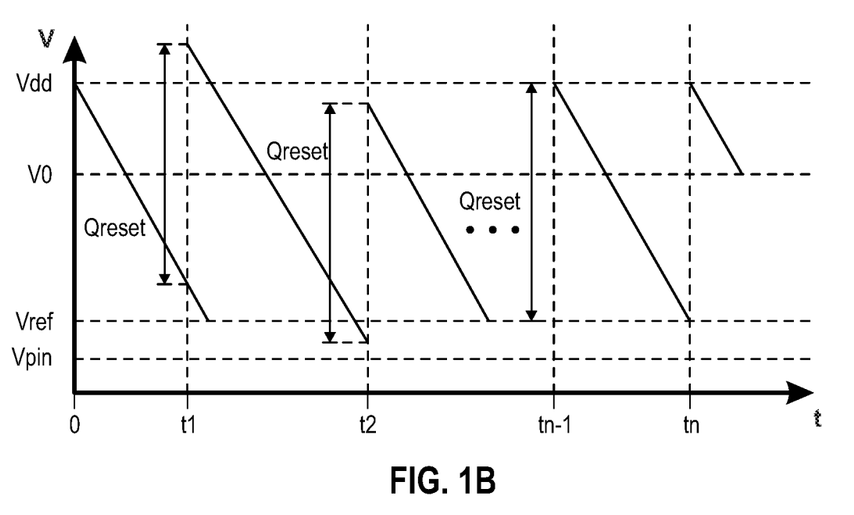
FIG. 1B is a timing diagram schematically showing the folding integration principle involved in an embodiment of the present invention.

FIG. 1B specifically shows how the folding integration principle works. Time is shown on a horizontal axis while voltage is shown on a vertical axis. Where an initial voltage of an upper plate of a capacitor is $V_{dd}$, after electric charge emitted from a photodiode receiving light is going through a demodulation module and allocated to the capacitor, a voltage of the capacitor starts dropping until a value of the voltage is less than or equal to a reference voltage $V_{ref}$ of a comparator. Then the comparator flips and a signal is folded, a new integration is proceeded with. This whole procedure repeats until the integration is completed. $(V_{dd}-V_0)$ is a last residual integral voltage. $V_{pin}$ represents a clamping voltage of the photodiode, and a lower limit of the voltage of the capacitor is $V_{pin}$. Where a capacitance value remains unchanging, and the vertical axis uses voltage to indicate an amount of electric charge. During each reset, an electric charge reset circuit charges the capacitor, and the amount of electric charge is a fixed $Q_{reset}$. Therefore a same amount of electric charge will be reset no matter at what time the comparator flips, so that $\Delta V$ remains the same. Then a total amount of electric charge is calculated to be:

$$Q=Q_{reset}*N+(V_{dd}-V_0)C_{int}$$

An application of the folding integration principle to an electric charge integral circuit involved in the embodiments of the present invention is that the electric charge accumulation unit receives electric charge during a certain time period; once an amount of electric charge received by the electric charge accumulation unit reaches a unit electric charge, the electric charge accumulation unit is reset and a counter circuit at the same time records that the electric charge accumulation has received one unit electric charge; in the end a calculation is proceeded with to determine a total amount of electric charge received by the electric charge accumulation unit during the certain time period by counting the number of times the electric charge accumulation unit has received the unit electric charge and the actual amount of the unit electric charge. The application of the folding integration principle not only improves the accuracy of the integral circuit but also reduces an area occupied by the electric charge accumulation unit, which further assists in optimizing the overall circuit structure. The technical solution provided by the embodiments of the present invention proposes to transfer a preset amount of the second electric charge whose polarity is opposite to that of the first electric charge from the electric charge storage unit to the electric charge accumulation unit and an amount of the transferred electric charge upon each reset is precisely ensured, which helps the folding integral circuit accurately reset and in turn gives rise to a more accurate calculation of the total integrated electric charge.

The technical solution for circuit reset according to the embodiments of the present invention will be described below in conjunction with application scenarios and with reference to the accompanying drawings. It should be noted that the above application scenarios are illustrated for the purpose of facilitating the understanding of the spirit and principle of the present invention, therefore the embodiments of the present invention are applicable to any scenarios rather than limited by the above given scenarios.

Figure 2A:
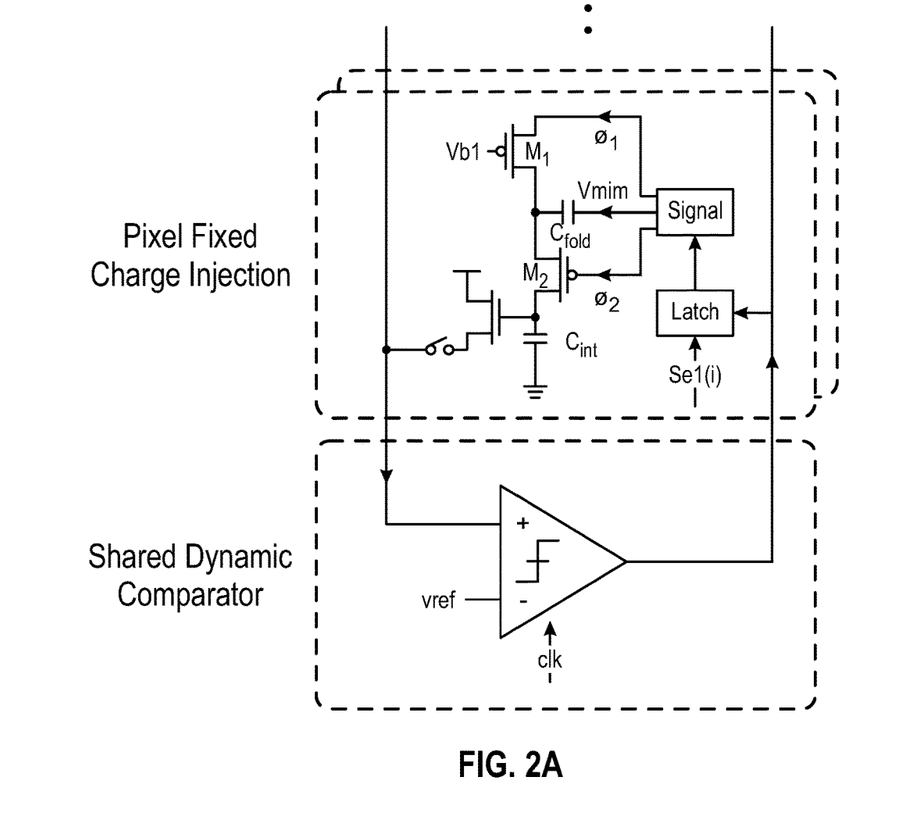
FIG. 2A is a schematic diagram schematically showing the structure of a reset device related to an embodiment of the present invention.

The embodiments of the present invention provide a reset device. An optional structure of the reset device is shown in FIG. 2A. The reset device at least comprises an electric charge accumulation unit, an electric charge storage unit and a control module. The electric charge accumulation unit is configured to store a first charge and an electric charge storage unit is configured to store a second electric charge. The reset device also comprises a control module. The control module is configured to control the electric charge storage unit to obtain the second electric charge and reset the electric charge accumulation unit so as to transfer a preset amount of the second electric charge from the electric charge storage unit to the electric charge accumulation unit. Optionally a polarity of the first electric charge is opposite to a polarity of the second electric charge.

The electric charge accumulation unit is an element or a device used for storing energy, which is not limited to a capacitor in the embodiments of the present invention. Specifically speaking, the electric charge accumulation unit is used for storing the first electric charge and the electric charge storage unit is used for storing the second electric charge. It could be understood that, in order to achieve the effect of resetting electric charge, the polarity of the first electric charge is opposite to the polarity of the second electric charge. Taking a circuit system composed by a pixel or a pixel array as an example, shown in FIG. 2B, the electric charge accumulation unit is disposed in a capacitor $C_{int}$ inside the pixel. An optional capacitor $C_{int}$ is used for storing electric charge generated by an external input of the pixel. It should be noted that the embodiments of the present invention do not limit the types of external output such as radiation, pressure, magnetic force etc., nor do they limit the times of resetting the charge accumulation unit to be single time or multiple times, such as cyclically resetting the electric charge accumulation unit.

The electric charge storage unit is an element or a device used for storing energy, which is not limited to a capacitor in the embodiments of the present invention. Taking the circuit system composed by a pixel or a pixel array as an example, shown in FIG. 2B, the electric charge storage unit could be an energy storage capacitor $C_{fold}$. Before transferring the second electric charge from the electric charge storage unit to the electric charge accumulation unit, the energy storage capacitor $C_{fold}$ is charged by one plate of the energy storage capacitor $C_{fold}$. While during the transferring of the second electric charge, the energy storage capacitor is charged by adjusting a voltage of another plate of the energy storage capacitor $C_{fold}$. Optionally, the energy storage capacitor $C_{fold}$ is disposed inside the pixel or inside the pixel array. And the optional energy storage capacitor $C_{fold}$ is able to be prepared by a semiconductor process.

Figure 2B:
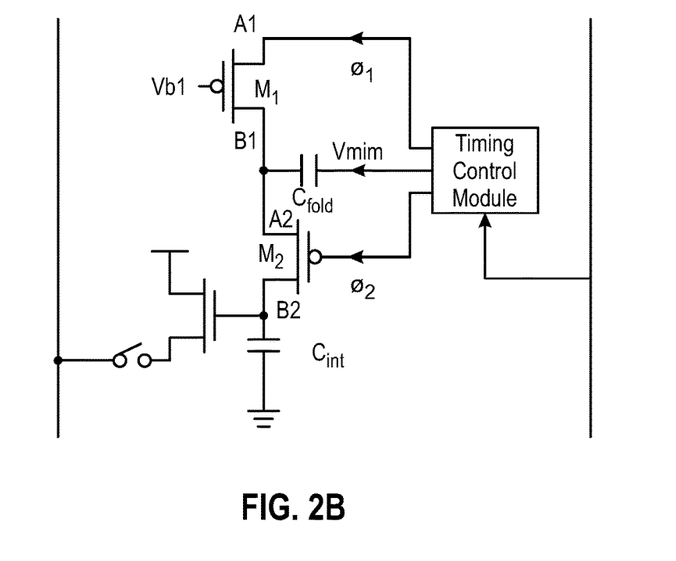
FIG. 2B is a schematic diagram schematically showing the structure of another reset device involved in an embodiment of the present invention.

Before the transferring of the second electric charge, the energy storage capacitor $C_{fold}$ firstly obtains a first preset amount of the second electric charge. During the transferring of the second electric charge, which is a reset process, the energy storage capacitor $C_{fold}$ is being charged so as to transfer a second preset amount of the second electric charge from the energy storage capacitor $C_{fold}$ to the electric charge accumulation unit $C_{int}$.

Furthermore, during the transferring of electric charge from the energy storage capacitor $C_{fold}$ to the electric charge accumulation unit $C_{int}$, the energy storage capacitor $C_{fold}$ is charged by raising a voltage of its bottom plate, more electric charge is therefore transferred to the capacitor $C_{int}$. The merit behind is that the second preset amount is greater than the first preset amount so that the capacitor $C_{fold}$ with a smaller energy storage capacity is able to reset a capacitor with a larger electric charge storage capacity. This is beneficial to further optimize the circuit structure and reduce an introduction of KTC noise during the reset process.

The reset device provided in the embodiments of the present invention transfers the preset amount of the second electric charge whose polarity is opposite to that of the first electric charge from the electric charge storage unit to the electric charge accumulation unit so that the first electric charge and the second electric charge cancel each other out. Such operation reduces a quantity of the first electric charge stored in the electric charge accumulation so as to continue to receive the first electric charge generated by radiation. Meanwhile an amount of the reduced first electric charge equals an amount of the second electric charge transferred so that the canceled first electric charge is quantified. A total amount of integrated electric charge is able to be calculated based on reset times and the amount of the second electric charge transferred to the electric charge accumulation unit each time. In a circuit unit using the reset method to control electric charge integration, such reset device not only helps avoid calculation error caused by an early arrival or a delay of a reset timing of integrated electric charge so as to improve accuracy of integrated electric charge but also prevents image trailing resulted in the circuit unit after reset, reduces reset noise and improves quality of output signal.

Figure 3:
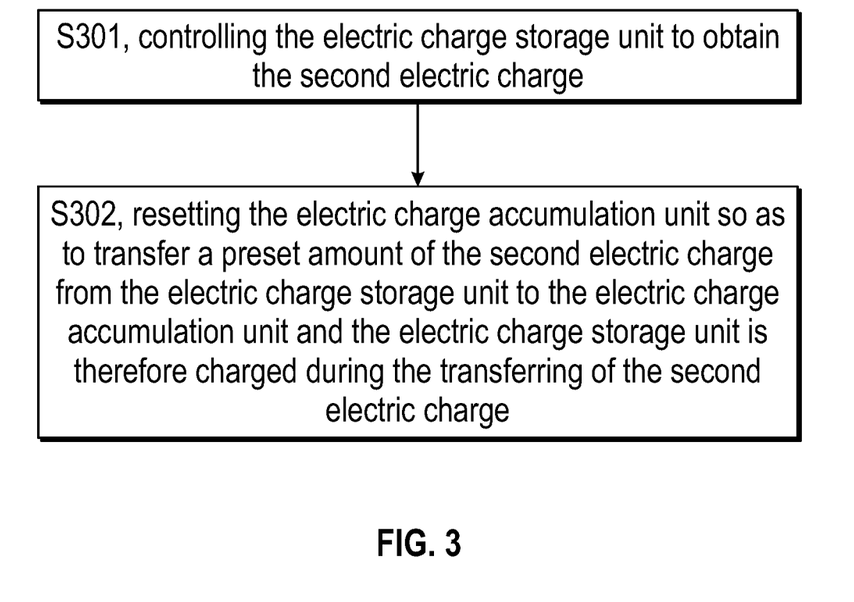
FIG. 3 is a schematic flowchart of a reset method according to an embodiment of the present invention.

A reset method provided by the embodiments of the present invention is shown in FIG. 3. An electric accumulation unit is used for storing a first electric charge. An electric charge storage unit is used for storing a second electric charge. A polarity of the first electric charge is opposite to a polarity of the second electric charge. The reset method comprises the following steps.

S301, controlling the electric charge storage unit to obtain the second electric charge.

S302, resetting the electric charge accumulation unit so as to transfer a preset amount of the second electric charge from the electric charge storage unit to the electric charge accumulation unit and the electric charge storage unit is therefore charged during the transferring of the second electric charge.

The reset method provided in the embodiments of the present invention is that the preset amount of the second electric charge, a polarity of which is opposite to that of the first electric charge, is transferred from the electric charge storage unit to the electric charge accumulation unit. The first electric charge and the second electric charge are thus combined to cause change to a voltage of the electric charge accumulation unit, so that an amount of electric charge transferred during each reset could be accurately controlled. For a circuit unit using the reset method to control electric charge integration, such reset method not only helps avoid calculation error caused by an early arrival or a delay of a reset timing of integrated electric charge so as to improve accuracy of integrated electric charge but also prevents image trailing resulted in the circuit unit after reset, reduces reset noise and improves quality of output signal.

The reset method shown in FIG. 3 is applied to the reset device shown in FIG. 2A. The electric charge accumulation unit involved in the reset method of the embodiments of the present invention is similar to the electric charge accumulation unit in the reset device. And the electric charge storage unit involved in the reset method of the embodiments of the present invention is similar to the electric charge storage unit in the reset device. Similarities are available by cross reference, repetition is hereby omitted.

In the embodiments of the present invention, the electric accumulation unit is configured to store the first electric charge and the electric charge storage unit is configured to store the second electric charge. The polarities of the first electric charge and the second electric charge are opposite so as to achieve an electric charge reset.

Each step of the reset method are illustrate in details as follows.

In S302, before resetting the electric charge accumulation unit, it is necessary to determine whether a voltage converted by the first electric charge stored in the electric charge accumulation unit exceeds a preset threshold voltage. It should be noted that, when the first electric charge in the electric charge accumulation unit is positive, whether the voltage converted by the first electric charge stored in the electric charge accumulation unit exceeds the preset threshold voltage means that whether it is not lower than the preset threshold voltage; if it is equal to or higher than the preset threshold voltage, the second electric charge is thus transferred to the electric charge accumulation unit. However when the first electric charge is negative, whether the voltage converted by the first electric charge stored in the electric charge accumulation unit exceeds the preset threshold voltage means that whether it is not higher than the preset threshold voltage; if it is equal to or lower than the preset threshold voltage, the second electric charge is thus transferred to the electric charge accumulation unit. This is not the only method to determine whether the voltage converted by the first electric charge exceeds the preset threshold voltage, other preset conditions are available to set to determine whether the electric charge accumulation unit should be reset.

When it is determined that the voltage converted by the first electric charge stored in the electric charge accumulation unit has exceeded the preset threshold voltage, the electric charge accumulation unit is reset as shown in S302. In S302, one implementation manner to reset the electric charge accumulation unit is that if the voltage converted by the first electric charge is determined as exceeding the preset threshold voltage, a control module comes in to reset the electric charge accumulation unit. Another implementation manner to reset the electric charge accumulation unit is that if the voltage converted by the first electric charge is determined as exceeding the preset threshold voltage, the control module resets the electric charge accumulation unit according to a preset timing.

In S302, before resetting the electric charge accumulation unit, the electric charge storage unit is controlled to charge through a first signal. Specifically speaking, various implementation manners of the first signal controlling the electric charge storage unit to charge are available, which are not limited in the present invention. One possible implementation manner is that the first signal controlling a first switch so that the second electric charge is stored in the electric charge storage unit. Where the first signal is output from a first port of the control module to the first switch, and the first switch is connected between a first end of the electric charge storage unit and the first port of the control module. The first switch provided in the embodiments of the present invention could be configured by either metal oxide semiconductor (MOS) or metal-oxide-semiconductor field-effect transistor (MOSFET), or any other components, which is not limited.

In order to guarantee that a preset amount of electric charge could be accurately transferred to the electric charge accumulation unit during electric charge integration, where after the first signal controlling the electric charge storage unit to charge and before the second signal controlling the electric charge storage unit to discharge, the second electric charge stored in the electric charge storage unit is released by the first switch until the first switch is in a sub-threshold region. The sub-threshold region, also refer to as a transistor sub-threshold state, is an important working state of MOS or MOSFET. A current under this state is called sub-threshold current. Sub-threshold current is weak but it could be controlled by a gate voltage. The transistor sub-threshold state is of assistance in application of logic switches, memories and other components under circumstances of low voltage and low power in large-scale integrated circuits.

One possible implementation manner of resetting the electric charge accumulation unit in S302 is that after the first signal controlling the electric charge storage unit to charge the second signal controlling the electric charge storage unit to discharge. Specifically speaking, various implementation manners are available to control the electric charge storage unit to discharge through the second signal, the present invention does not limit the implementation manners. One possible implementation manner is that a second switch is controlled through the second signal to be turned off so as to transfer the second electric charge from the electric charge storage unit to the electric charge accumulation unit. The second signal is output from a second port of the control module to a control end of the second switch, and the second switch is connected between the first end of the electric charge storage unit and the electric charge accumulation unit. The second switch provided in the embodiments of the present invention could be configured as any one of MOS, MOSFET or other components, which is not limited hereby.

Furthermore, during the second signal controlling the electric charge storage unit to discharge, a first start time is defined when the second signal controls the second switch to be turned off. When the first start time runs through a first preset time period, or/and when the second switch is in the sub-threshold region, the second switch is turned off to stop the second electric charge from transferring from the electric charge storage unit to the electric charge accumulation unit. It should be noted that the first start time could be the same time as a second start time that is going to be introduced as below, or a different time as the second start time, which is not limited in the embodiments of the present invention.

In S302, during the second electric charge being transferred from the electric charge storage unit to the electric charge accumulation unit, a control voltage is applied to a second end of the electric charge storage unit through a third port of the control module.

Specifically speaking, one implementation manner of the third port of the control module applying the control voltage to the second end of the electric charge storage unit comprises the following steps. The control voltage applied to the second end of the electric charge storage unit through the third port is gradually changed according to a preset direction. This process is able to prevent electric charge from overflowing. It should be understood that when the electric charge stored in the electric charge storage unit is positive, charging the electric charge storage unit during the transferring of the second electric charge is realized by raising the control voltage applied to the second end of the electric charge storage unit. However when the electric charge stored in the electric charge storage unit is negative, charging the electric charge storage unit during the transferring of the second electric charge is realized by reducing the control voltage applied to the second end of the electric charge storage unit. The control voltage changes for the purpose of compensating a reduction in a potential difference between the electric charge storage unit and the electric charge accumulation unit during the transferring. This is beneficial to transferring more electric charge to the electric charge accumulation unit and therefore transferring more electric charge through small capacitors, and further reducing reset noise.

Another implementation manner of the third port of the control module applying the control voltage to the second end of the electric charge storage unit comprises the following steps. A second start time is defined when the second electric charge starts to transfer from the electric charge storage unit to the electric charge accumulation unit. Once the second start time runs through a second preset time period, the third port of the control module charges the second end of the electric charge storage unit so as for the control voltage to change to a preset threshold. Then the control voltage is kept at the preset threshold until the second switch is turned off to stop charging the second end of the electric charge storage unit.

Example 1

Figure 4:
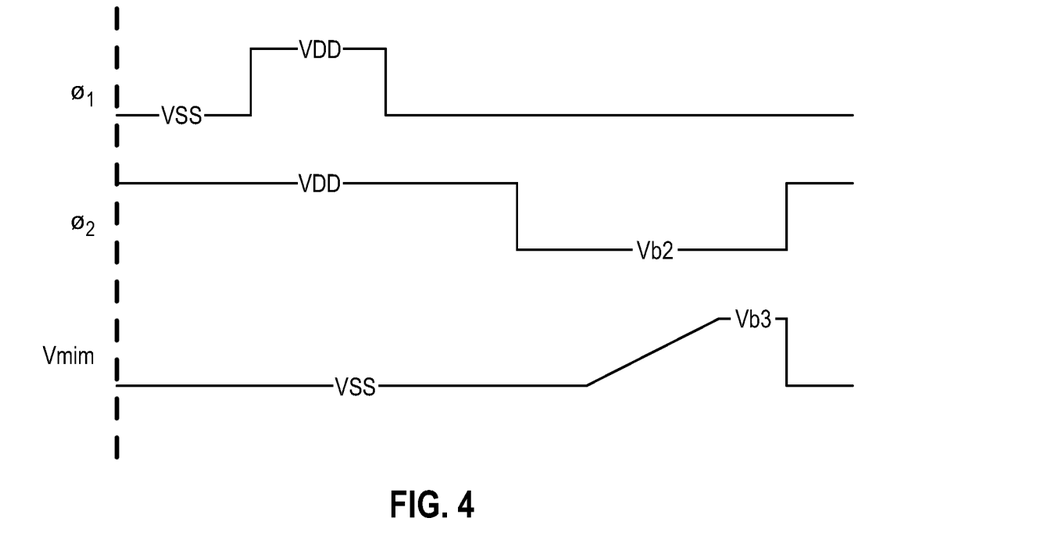
FIG. 4 is a schematic diagram schematically showing a time sequence of a charge reset related to an embodiment of the present invention.

A detailed electric charge reset process illustrated as follows will be taken as an example to explain each step of the above reset method. FIG. 4 is a timing diagram of the electric charge reset process. A reset circuit structure involved in the electric charge reset process is shown in FIG. 2B. The process is as follows.

At time 0~t1, the first signal $\phi_1$ output from the control module is low electrical level, the second signal $\phi_2$ is high electrical level, $V_{mim}$ is low electrical level. In this case, the first switch M1 and the second switch M2 are both turned off.

At time t1~t2, the first signal $\phi_1$ changes to high electrical level, the second signal $\phi_2$ remains high electrical level, and $V_{mim}$ remains low electrical level. In this case, the first switch M1 is turned on while the second switch M2 is turned off. When applying the voltage of $V_{dd}$ to a left plate of the capacitor $C_{fold}$ in the electric charge storage unit, the first electric charge $Q_1 = -VDD \times C_{fold}$.

At time t2~t3, the first signal $\phi_1$ changes to low electrical level, the second signal $\phi_2$ remains high electrical level, $V_{mim}$ remains low electrical level. In this case, the second switch M2 is turned off, an electric charge overflowing from the capacitor $C_{fold}$ to flow back through M1 and enters the sub-threshold region. The voltage of the left plate of the capacitor $C_{fold}$ thus changes to Vb1+Vth1. Such operation makes sure that the preset amount of the second electric charge Q2 has been obtained by the time that the capacitor $C_{fold}$ starts to transfer electric charge to the capacitor $C_{int}$. The amount of the second electric charge under this circumstance is that $Q_2 = [VSS-(Vb_1+Vth_1)]C_{fold}$, where Vb1 is the Vb1 shown in FIG. 2A.

At time t3~t4, the first signal $\phi_1$ is low electrical level, the second signal $\phi_2$ is set to be low electrical level Vb2, $V_{mim}$ is low electrical level. The second switch M2 is turned on, the second electric charge is transferred to the capacitor $C_{int}$ in the electric charge accumulation unit through M2, and a voltage of a upper plate of the capacitor $C_{int}$ changes to a sum of Vb2 and Vth2.

At time t4~t5, the first signal $\phi_1$ is low electrical level, the second signal $\phi_2$ is low electrical level, $V_{mim}$ gradually rises to Vb3 from low electrical level. The voltage of the left plate of the capacitor $C_{fold}$ gradually rises to cause $V_{mim}$ to gradually rise to Vb3 from low electrical level so to prevent electric charge from overflowing from the first switch M1.

At time t5~t6, the first signal $\phi_1$ is low electrical level, the second signal $\phi_2$ is low electrical level, $V_{mim}$ is Vb3, and a voltage of a right plate of the capacitor $C_{fold}$ rises to Vb3 to maintain the state for a period of time. The second switch M2 is turned on and enters the sub-threshold region during this period of time or at the latest at time t6 to obtain an accurate retained voltage. An amount of Q3 of the capacitor $C_{fold}$ at this time is $Q_3=[Vb_3-(Vb_2+Vth_2)]C_{fold}$. Therefore, an amount of electric charge transferred to the capacitor $C_{fold}$ could be accurately assured as $Q_{fold}=Q_3-Q_2=(Vb_3-Vb_2+Vb_1)C_{fold}$ (Vth$_1 \approx$Vth$_2$). Electric charge flows to the capacitor $C_{int}$ through the second switch M2.

After time t6, the first signal $\phi_1$ is low electrical level, the second signal $\phi_2$ is high electrical level, $V_{mim}$ is low electrical level, and the transferring of electric charge stops.

According to the calculation formula of $Q_{fold}$, the embodiments of the present invention are able to rise to the larger voltage Vb3 and set the larger voltage Vb2 and the smaller electric charge storage unit $C_{fold}$ as compared to an existing reset circuit structure. The larger voltage Vb2 helps with compensating a voltage swing of a capacitor limited by a used of a Pinned photodiode to receive near-infrared signals. The smaller electric charge storage unit $C_{fold}$ helps with reducing or even preventing KTC noise introduced during the reset process. In detail, when the first switch and the second switch are both working in the sub-threshold region, in order to improve a signal-to-noise ratio, a noise of the reset circuit is $$\frac{1}{\sqrt{2}}$$

of KTC noise in general Therefore a noise electric charge is:

$$Q_{n,kTC} = C_{fold} \cdot V_{n,kTC} = C_{fold} \cdot \sqrt{2 \cdot \frac{kT}{2C_{fold}}} = \sqrt{kT \cdot C_{fold}}$$

Figure 5:
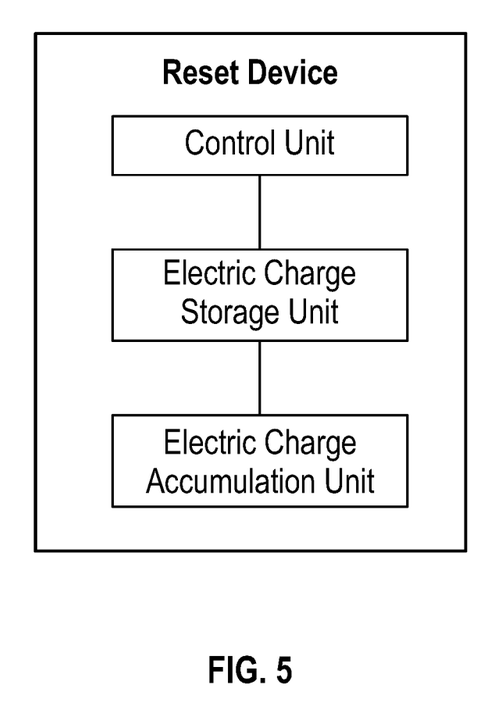
FIG. 5 is a schematic diagram schematically showing a structure of a reset device related to an embodiment of the present invention.

The embodiments of the present invention further provide another reset device. A structure of an optional reset device is shown in FIG. 2A or FIG. 5.

The reset device at least comprises an electric charge accumulation unit, an electric charge storage unit and a control module. The electric charge accumulation unit is configured to store a first electric charge. The electric charge storage unit is configured to store a second electric charge. The control module is configured to control the electric charge storage unit to obtain the second electric charge, reset the electric charge accumulation unit so as to transfer a preset amount of the second electric charge from the electric charge storage unit to the electric charge accumulation unit, and charge the electric charge storage unit during the transferring of the second electric charge.

Optionally, a polarity of the first electric charge is opposite to a polarity of the second electric charge.

Optionally, the control module is further configured to control the electric charge storage unit to charge through a first signal before resetting the electric charge accumulation unit. During resetting the electric charge accumulation unit by the control module, the control module controls the electric charge storage unit to discharge through a second signal.

Optionally, the reset device further comprises a first switch. The first switch is connected between a first end of the electric charge storage unit and a first port of the control module. During the control module controlling the electric charge storage unit to charge through the first signal, the control module is further configured to control the first switch to allow the second electric charge to be stored in the electric charge storage unit through the first signal. The first signal is output from the first port of the control module to the first switch.

Optionally, the control module is further used where after the first signal controlling the electric charge storage unit to charge and before the second signal controlling the electric charge storage unit to discharge, the second electric charge stored in the electric charge storage unit is released by the first switch until the first switch is in a sub-threshold region.

Optionally, the reset device further comprises a second switch. The second switch is connected between the first end of the electric charge storage unit and the electric charge accumulation unit. During the control module controlling the electric charge storage unit to discharge through the second signal, the control module is further configured to control the second switch to be turned off through the second signal so as to transfer the preset amount of the second electric charge from the electric charge storage unit to the electric charge accumulation unit. The second signal is output from a second port of the control module to a control end of the second switch.

Optionally, during the control module controlling the electric charge storage unit to discharge through the second signal, a first start time is defined when the second signal controls the second switch to be turned off. When the first start time runs through a first preset time period, or/and when the second switch is in the sub-threshold region, the second switch is turned off to stop the second electric charge from transferring from the electric charge storage unit to the electric charge accumulation unit.

Optionally, during the control module transferring the preset amount of the second electric charge from the electric charge storage unit to the electric charge accumulation unit, the control module is further configured to apply a control voltage to a second end of the electric charge storage unit through a third port of the control module.

Optionally, during the control module applying the control voltage to the second end of the electric charge storage unit through the third port, the control module is further configured to gradually change the control voltage applied to the second end of the electric charge storage unit through the third port according to a preset direction.

In a possible solution, the control voltage applied to the second end of the electric charge storage unit through the third port is gradually raised.

In a possible solution, the control voltage applied to the second end of the electric charge storage unit through the third port is gradually reduced. The preset direction is determined by polarity of electric charge.

Optionally, during the control module applying the control voltage to the second end of the electric charge storage unit through the third port, a second start time is defined when the second electric charge starts to transfer from the electric charge storage unit to the electric charge accumulation unit. When the second start time runs through a second preset time period, the third port of the control module charges the second end of the electric charge storage unit so as for the control voltage to change to a preset threshold. Then the control voltage is kept at the preset threshold until the second switch is turned off to stop charging the second end of the electric charge storage unit.

Optionally, before the control module resetting the electric charge accumulation unit, the control module is further configured to determine whether a voltage converted by the first electric charge stored in the electric charge accumulation unit has exceeded a preset threshold voltage. If it is determined that the voltage converted by the first electric charge stored in the electric charge accumulation unit exceeds the preset threshold voltage the electric charge accumulation unit will be reset.

Optionally, during the control module resetting the electric charge accumulation unit, if it is determined that the voltage converted by the first electric charge exceeds the preset threshold voltage, the control module resets the electric charge accumulation unit or the control module resets the electric accumulation unit according to a preset timing.

The reset device further comprises a comparator. The comparator is configured to compare the voltage converted by the first electric charge stored in the electric charge accumulation unit with a preset reference voltage and feedback a comparison result to the control module. Therefore the control module is able to determine whether to transfer the preset amount of the second electric charge whose polarity is opposite to that of the first electric charge from the electric charge storage unit to the electric charge accumulation unit.

The reset device further comprises a source follower. The source follower is configured to obtain the voltage converted by the first electric charge stored in the electric charge accumulation unit. Optionally, a gate of the source follower is connected to the electric charge accumulation unit and a communal terminal of the second switch, while an output of the source follower is connected to an input of the comparator. A switch is provided between the output of the source follower and the input of the comparator.

Optionally, the reset device is further provided with an electric charge reset circuit, which at least comprises a plurality of electric charge reset modules, a plurality of latches and the comparators shared by the plurality of electric charge reset modules. The electric charge reset modules are configured to be the reset device involved in the embodiments. Furthermore, the latches are disposed between the comparator and at least one pixel. The comparison result by the comparator is stored in the latch of the comparator's corresponding pixel so as to feedback the comparison result to the electric charge reset module when the preset timing is satisfied or upon receiving an output order. Preferably, the output order is sent to at least one latch.

It should be noted that each pixel could be equipped with a latch for time-sharing storage of the comparison results by multiple capacitors in the pixels and then to perform a cyclic integration process through the electric charge reset modules.

Alternatively each pixel could be equipped with the plurality of latches and each latch stores the comparison results. The latches are able to feedback the comparison results to the electric charge reset modules at a preset time or time internal according to the preset timing or to feedback the comparison results to the electric charge reset modules upon receiving the output order.

Furthermore, the latches of multiple pixels are able to feedback the comparison results to its corresponding electric charge reset module at the same time according to the preset timing or according to a same output order. Or the latch of each pixel could be independently controlled to feedback the comparison results.

One embodiment of the present invention further provides an electric charge reset device which comprises a plurality of electric charge reset modules, a plurality of latches and the comparators shared by the plurality of electric charge reset modules in a time-sharing manner. The plurality of electric charge reset modules could be any reset device provided in the embodiments shown in FIG. 2A or FIG. 5. The comparators are configured to compare the voltage converted by the electric charge accumulation unit of the plurality of electric charge reset modules with the reference voltage. The comparison results are output to the plurality of latches respectively corresponding to the plurality of electric charge reset modules. The latches are configured to store the comparison results converted by its corresponding electric charge accumulation unit. The corresponding electric charge accumulation unit is controlled by the comparison results by the plurality of electric charge accumulation units. The electric charge reset module is configured to reset the electric charge in the electric charge accumulation unit.

One embodiment of the present invention further provides a reset system, which comprises any one of the reset devices in the embodiments corresponding to either FIG. 2A or FIG. 5, or the electric charge reset device in the last embodiment.

One embodiment of the present invention further provides a pixel array, which comprises any one of the reset devices in the embodiments corresponding to either FIG. 2A or FIG. 5, or the electric charge reset device in the last embodiment.

Those skilled in the art should understand that the embodiments of the present invention can be provided as a method, a system, or a computer program product. Therefore the present invention may adopt the form of a complete hardware embodiment, a complete software embodiment, or an embodiment combining software and hardware. Moreover, the present invention may adopt the form of a computer program product implemented on one or more computer-usable storage media (including but not limited to disk storage, CD-ROM, optical storage, etc.) containing computer-usable program codes.

It should be understood that when a unit/module is described as being "connected", it may be directly connected to another unit/module, or an intermediate unit/module may exist.

In contrast, when the unit/module is called "directly connected", there is no intermediate unit/module.

This application is described with reference to flowcharts and/or block diagrams of methods, equipment (systems), and computer program products according to this application. It should be understood that each process and/or block in the flowchart and/or block diagram, and the combination of processes and/or blocks in the flowchart and/or block diagram can be realized by computer program instructions. These computer program instructions can be provided to the processor of a general-purpose computer, a special-purpose computer, an embedded processor, or other programmable data processing equipment to generate a machine, so that the instructions executed by the processor of the computer or other programmable data processing equipment are generated It is a device that realizes the functions specified in one process or multiple processes in the flowchart and/or one block or multiple blocks in the block diagram.

These computer program instructions can also be stored in a computer-readable memory that can direct a computer or other programmable data processing equipment to work in a specific manner, so that the instructions stored in the computer-readable memory produce an article of manufacture including the instruction device. The device implements the functions specified in one process or multiple processes in the flowchart and/or one block or multiple blocks in the block diagram.

These computer program instructions can also be loaded on a computer or other programmable data processing equipment, so that a series of operation steps are executed on the computer or other programmable equipment to produce computer-implemented processing, so as to execute on the computer or other programmable equipment. Instructions provide steps for implementing functions specified in a flow or multiple flows in the flowchart and/or a block or multiple blocks in the block diagram. Obviously, those skilled in the art can make various changes and modifications to the application without departing from the spirit and scope of the application. In this way, if these modifications and variations of this application fall within the scope of the claims of this application and their equivalent technologies, this application is also intended to include these modifications and variations.

What is claimed is:

1. A reset method, wherein an electric charge accumulation unit is configured to store a first electric charge and an electric charge storage unit is configured to store a second electric charge; a polarity of the first electric charge is opposite to a polarity of the second electric charge; the reset method comprising the following steps:
controlling the electric charge storage unit to obtain the second electric charge; and
resetting the electric charge accumulation unit so as to transfer a preset amount of the second electric charge from the electric charge storage unit to the electric charge accumulation unit, which comprises a third port of the control module applying a control voltage to a second end of the electric charge storage unit; and meanwhile charging the electric charge storage unit during the process of transferring the second electric charge.

2. The reset method of claim 1, wherein controlling the electric charge storage unit to obtain the second electric charge specifically comprises a first signal controlling the electric charge storage unit to charge; and resetting the electric charge accumulation unit specifically comprises a second signal controlling the electric charge storage unit to discharge.

3. The reset method of claim 2, wherein the first signal controlling the electric charge storage unit to charge comprises the first signal controlling a first switch so that the second electric charge could be stored in the electric charge storage unit,
wherein the first signal is output from a first port of a control module to the first switch, and the first switch is connected between a first end of the electric charge storage unit and the first port of the control module.

4. The reset method of claim 3, after the first signal controlling the electric charge storage unit to charge and before the second signal controlling the electric charge storage unit to discharge, further comprising releasing the second electric charge stored in the electric charge storage unit by the first switch so that the electric charge storage unit is able to obtain the preset amount of the second electric charge.

5. The reset method of claim 4, wherein the second electric charge stored in the electric charge storage unit keeps releasing by the first switch until the first switch stays in a sub-threshold region, so that the electric charge storage unit is able to obtain the preset amount of the second electric charge.

6. The reset method of claim 2, wherein the second signal controlling the electric charge storage unit to discharge specifically comprises the second signal controlling a second switch to be turned off so that the second electric charge could be transferred from the electric charge storage unit to the electric charge accumulation unit; the second signal is output from a second port of the control module to a control end of the second switch; and the second switch is connected between the first end of the electric charge storage unit and the electric charge accumulation unit.

7. The reset method of claim 6, wherein the second signal controlling the electric charge storage unit to discharge further comprises a first start time is defined when the second signal controls the second switch to be turned off, when the first start time runs through a first preset time period, or when the second switch is in the sub-threshold region, the second switch is turned off to stop the second electric charge from transferring from the electric charge storage unit to the electric charge accumulation unit.

8. The reset method of claim 7, wherein the third port of the control module applying a control voltage to the second end of the electric charge storage unit specifically means that the control voltage applied to the second end of the electric charge storage unit through the third port of the control module is gradually changed according to a preset direction.

9. The reset method of claim 7, wherein the third port of the control module applying a control voltage to the second end of the electric charge storage unit specifically means that a second start time is defined when the second electric charge starts to transfer from the electric charge storage unit to the electric charge accumulation unit; when the second start time runs through a second preset time period, the third port of the control module charges the second end of the electric charge storage unit so as for the control voltage to change to a preset threshold; then the control voltage is kept at the preset threshold until the second switch is turned off, then the control module stops charging the second end of the electric charge storage unit.

10. The reset method of claim 1, before resetting the electric charge storage unit, further including:
   determining whether a voltage converted by the first electric charge stored in the electric charge accumulation unit has exceeded a preset threshold voltage; and
   resetting the electric charge accumulation unit, wherein the electric charge accumulation unit will be reset once it is determined that the voltage converted by the first electric charge stored in the electric charge accumulation unit exceeds the preset threshold voltage.

11. The reset method of claim 10, wherein resetting the electric charge accumulation unit specifically means that once it is determined that the voltage converted by the first electric charge exceeds the preset threshold voltage, the control module resets the electric charge accumulation unit or the control module resets the electric accumulation unit according to a preset time order.

12. A reset device comprising:
   an electric charge accumulation unit for storing a first electric charge;
   an electric charge storage unit for storing a second electric charge, wherein a polarity of the first electric charge is opposite to a polarity of the second electric charge; and
   a control module for controlling the electric charge storage unit to obtain the second electric charge and resetting the electric charge accumulation unit so as to transfer a preset amount of the second electric charge from the electric charge storage unit to the electric charge accumulation unit, which comprises a third port of the control module applying a control voltage to a second end of the electric charge storage unit; and meanwhile the electric charge storage unit is charged during the process of transferring the second electric charge.

13. The reset device of claim 12, wherein during the control module controlling the electric charge storage unit to obtain the second electric charge, the control module controls the electric charge storage unit to charge through the first signal; and during resetting the electric charge accumulation unit by the control module, the control module controls the electric charge storage unit to discharge through the second signal.

14. The reset device of claim 13, further comprising a first switch, wherein the first switch is connected between a first end of the electric charge storage unit and the first port of the control module;
   during the control module controlling the electric charge storage unit to charge through the first signal, the control module is further configured to control the first switch to allow the second electric charge to be stored in the electric charge storage unit through the first signal; and
   the first signal is output from the first port of the control module to the first switch.

15. The reset device of claim 14, wherein after the first signal controlling the electric charge storage unit to charge and before the second signal controlling the electric charge storage unit to discharge, the control module is further configured to release the second electric charge stored in the electric charge storage unit through the first switch so that the electric charge storage unit is able to obtain the preset amount of the second electric charge.

16. The reset device of claim 15, wherein the control module is configured to release the second electric charge stored in the electric charge storage unit by the first switch until the first switch stays in a sub-threshold region, so that the electric charge storage unit is able to obtain the preset amount of the second electric charge.

17. The reset device of claim 13, further comprising a second switch, wherein the second switch is connected between the first end of the electric charge storage unit and the electric charge accumulation unit; and
   during the control module controlling the electric charge storage unit to discharge through the second signal, the second switch is controlled through the second signal to be turned off so as to transfer the second electric charge from the electric charge storage unit to the electric charge accumulation unit; the second signal is output from a second port of the control module to a control end of the second switch.

18. The reset device of claim 17, wherein during the second signal controlling the electric charge storage unit to discharge,
   a first start time is defined when the second signal controls the second switch to be turned off, when the first start time runs through a first preset time period, or when the second switch is in the sub-threshold region, the second switch is turned off to stop the second electric charge from transferring from the electric charge storage unit to the electric charge accumulation unit.

19. The reset device of claim 12, wherein the third port of the control module applying a control voltage to the second end of the electric charge storage unit specifically means that the control voltage applied to the second end of the electric charge storage unit through the third port of the control module is gradually changed according to a preset direction.

20. The reset device of claim 12, wherein during the third port of the control module applying the control voltage to the second end of the electric charge storage unit, a second start time is defined when the second electric charge starts to transfer from the electric charge storage unit to the electric charge accumulation unit, when the second start time runs through a second preset time period, the third port of the control module charges the second end of the electric charge storage unit so as for the control voltage to change to a preset threshold, then the control voltage is kept at the preset threshold until the second switch is turned off to stop charging the second end of the electric charge storage unit.

* * * * *